United States Patent [19]

Breeden et al.

[11] Patent Number: 5,260,993
[45] Date of Patent: Nov. 9, 1993

[54] QUEUING APPARATUS AND METHOD FOR A CORDLESS COMMUNICATION TRANSCEIVER

[75] Inventors: Robert L. Breeden; Richard E. Bessom, both of Boca Raton, Fla.

[73] Assignee: Motorola, Inc., Schaumburg, Ill.

[21] Appl. No.: 864,253

[22] Filed: Apr. 6, 1992

[51] Int. Cl.⁵ .................... H04M 3/00; H04M 11/00
[52] U.S. Cl. ...................... 379/266; 379/58; 379/61
[58] Field of Search .............. 379/58, 59, 61, 63, 379/67, 266; 455/33.1

[56] References Cited

U.S. PATENT DOCUMENTS

| | | | |
|---|---|---|---|
| 4,593,155 | 6/1986 | Hawkins | 455/88 |
| 4,748,655 | 5/1988 | Thrower et al. | 379/58 |
| 4,788,715 | 12/1988 | Lee | 379/88 |
| 4,792,984 | 12/1988 | Matsuo | 379/59 |
| 4,953,204 | 8/1990 | Cuschleg, Jr. et al. | 379/266 |
| 5,025,468 | 6/1991 | Sikand et al. | 379/67 |

OTHER PUBLICATIONS

CT2 Common Air Interface, published by ETSI (European Telecommunications Standards Institute), Valbonne Cedex, France, Version 1.1 published Jun. 30, 1991, pp. 21-23 and 38-39.

Primary Examiner—Curtis Kuntz
Assistant Examiner—Vijay Shankar
Attorney, Agent, or Firm—Philip P. Macnak; William E. Koch; Thomas G. Berry

[57] ABSTRACT

A communication system is described which provides call queueing between a base station (400) which does not have a control channel and a plurality of portable communication handsets (401). The base station (400) determines when all channels are busy, and following one becoming available, transmits a first predetermined code. All portable communication handsets (401) which attempted to communicate with the base station (400) when all channels were busy, sets a queue mode flag, and starts a timer (455, 461). When a first predetermined code is detected by any handset (401) having attempted to establish communication with the base station (400), the first timer (455, 461) continues, and a second timer (455, 461) operating at a second rate is started at the value established by the first timer (455, 461). When the second timer (455, 461) value reaches a predetermined value, the handset (401) proceeds to attempt to establish communication with the base station (400) on the channel that became available.

18 Claims, 11 Drawing Sheets

QUEUING APPARATUS AND METHOD FOR A CORDLESS COMMUNICATION TRANSCEIVER

BACKGROUND OF THE INVENTION

1. Field of the Invention

The present invention relates generally to the field of cordless communication devices, and more particularly to a cordless communication device having message queuing capability.

2. Description of the Prior Art

Communication systems, such as cellular communication systems, utilize a control channel to enable communication devices, such as portable hand held transceivers, to register into the system. Once contact has been made between the portable hand held transceiver and a cell site controller over the control channel, the portable hand held transceiver is then directed to a data or voice channel on which the actual communication will take place. When more portable hand held transceivers are attempting to gain access to the system than can be supported by the number of data or voice channels available at the cell site, the control channel enables the cell site controller to identify the portable hand held transceivers which are attempting access to the system, and places the portable hand held transceivers in a call waiting queue until a data or voice channel becomes available. The cell site controller, through the control channel, then accesses the portable hand held transceiver having been in queue the longest, and directs the portable hand held transceiver to the open data or voice channel. In this manner, even when the system is fully loaded, all portable hand held transceivers have an opportunity to register into the system and to be provided with an open data or voice channel in the order in which the portable hand held transceivers attempted to gain access to the system.

There are, however, some communication systems, such as the second generation cordless telephone (CT2) systems which do not provide a control channel to enable access to the system by the portable radiotelephone handsets operating in the system, such as handsets. Consequently, in such systems, when all channels are busy, there is no way to queue other handsets attempting to place a call. There is a need to be able to provide queuing for handsets operating in such systems in order to improve the grade of performance provided by the system.

SUMMARY OF THE INVENTION

In accordance with one aspect of the present invention, a method for queuing calls being placed from portable radiotelephone handsets to a base station which provides operation on at least one channel is described. The handsets are capable of operating on a plurality of frequencies, including the at least one channel. The base station determines when the at least one channel is busy and transmits a first predetermined code when the at least one channel becomes subsequently available. The handset attempting to establish communication with the base station detects when the at least one channel is busy while attempting to place a call, and after detecting the transmission of the first predetermined code generates a first count representative of the elapsed time between detecting when the channel is busy and when the first predetermined code is detected. A second count is next generated when the first predetermined code is detected, the second count starting at the first count. The second count generated is compared with a predetermined count. When the second count matches the predetermined count, the handset can attempt to establish communication with the base station.

In accordance with another aspect of the present invention, a communication system which provides call queueing comprises a base station and a plurality of portable communication handsets. The base station includes a base station transceiver having at least one communication channel used for establishing communication with the plurality of portable communication handsets. The base station includes means, coupled to the base station transceiver, for determining when the at least one channel is busy, and a base station controller for controlling the transmission of a first predetermined code when the at least one channel becomes subsequently available. The plurality of portable communication handsets comprise a handset transceiver for establishing communication with the base station on the at least one channel, a first detecting circuit, coupled to the handset transceiver means, for detecting when the at least one channel is busy while attempting to place a call, and a second detecting circuit, coupled to the handset transceiver, for detecting the transmission of the first predetermined code. A count generating circuit, responsive to the first and second detecting circuits, generates a first count representative of the elapsed time between detecting the at least one channel is busy, and when the first predetermined code is detected. A second count generating circuit generates a second count starting with the first count in response to the first predetermined code being detected. A handset controller then controls an attempt to establish communication with the base station when the second count matches a predetermined count.

In accordance with another aspect of the present invention, a portable communication transceiver having call queuing capability is described, and includes a means for placing a call to a base station having at least one channel. The portable communication transceiver comprises a first circuit for detecting when the channel is busy while attempting to place a call, and for generating in response thereto a queue mode signal. A second circuit detects the transmission of a first predetermined code, and generates in response thereto a counter inhibit signal. A count generating circuit which is responsive to the queue mode signal and to the counter inhibit signal, generates a first count representative of the elapsed time between when the channel is detected as being busy, and when the first predetermined code is detected. A second count generating circuit generates a second count starting with the first count. A controller attempts to complete the call on the available channel when the second count matches a predetermined count.

DESCRIPTION OF THE PREFERRED EMBODIMENTS

Figure 1:
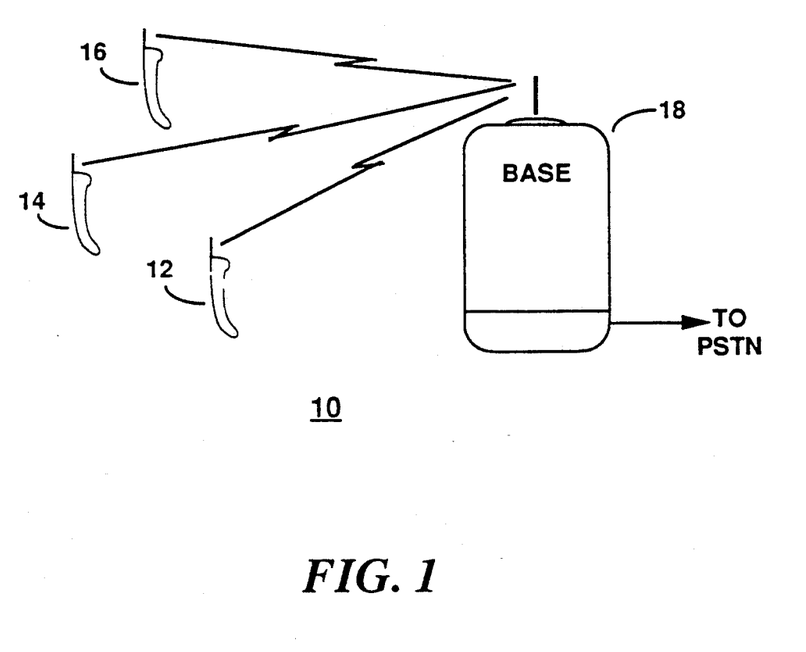
FIG. 1 is a pictorial representation of a typical telepoint base station site in a cordless radiotelephone communication system.

Second generation cordless telephone (CT2) systems 10, such as shown in FIG. 1, do not provide a control channel to enable access to the system by the portable radiotelephone handsets operating in the system, such as handsets 12, 14 and 16. A typical telepoint base station 18 has between two and six channels available for outbound calling by the portable radiotelephone handsets. If, for example, when the telepoint base station 18 has only two channels available, and three or more handsets are attempting to place calls, only the first two handsets to register with the base station 18 are able to complete the calls, the additional portable radiotelephone handsets are blocked from gaining access to the system. The portable radiotelephone handset user then has only two options available in order to gain system access. One is to wait and retry at a later time, and the other is to move to another telepoint base site which may have telepoint base site channels available. When a number of portable radiotelephone handset users are trying to gain access at substantially the same time at a telepoint base site, access to an available telepoint base site channel becomes not on a first to register basis, as described above, but rather on a first to call basis after a telepoint base site channel has become available. The result can be frustration for the portable radiotelephone handset user who cannot place a call because another user who may have gotten to the telepoint base site after the first, gains system access first.

In the preferred embodiment of the present invention, the handsets are configured to perform the queueing operation, as will be described in further detail below. All handsets have an individual address, or portable ID (PID), uniquely identifying the handset and a special address (SPCL_ID) common to all handsets. Whenever a handset attempts to make an outbound call and fails to do so because all base station channels are busy at a particular telepoint site where the call is being placed, the handset automatically enters into a queue mode and starts a timing sequence which times how long the handset is in the queue mode. In a very busy system, several handsets may be in the queue mode simultaneously awaiting access to a channel. Because the queue mode is initiated when access to a channel is attempted, each of the handsets will generally have different time values generated corresponding to the time when access was attempted. Consequently, those handsets having the highest time values will have waited in queue for a channel for the longest time.

Although the base station lacks any knowledge of call attempts from handsets when all channels are busy, the base station does know when all channels are busy, consequently the base station has knowledge that there could have been a number of unsuccessful call attempts.

Accordingly, in the preferred embodiment of the present invention, whenever the base station operates in a condition that could potentially result in unsuccessful call attempts, when a channel becomes available following such a situation, the base station begins polling for handsets which are in the queue mode using the special address described above. Those handsets which are in the queue mode respond to the special address by establishing a timer based on the time the handset is in queue, as will be described further below. The handset which has been in the queue mode the longest time will consequently respond prior to the other handsets, thereby enabling the handset to gain access to the free channel ahead of the other handsets awaiting in the queue. Once a handset attempts to establish communication with the base station, the remaining handsets awaiting in the queue return to keeping track of the time that the handsets are again in queue, as will be described below. In this manner, even though the base station does not have a control channel, the handsets have the capability to control their position in a call waiting queue when more that one handset tries to establish communication with a base station having all channels busy.

The specific interaction of the handsets and the base station in a first embodiment of the present invention are described in FIGS. 2 through 5, and in a second embodiment of the present invention in FIGS. 6 through 9.

Figure 2:
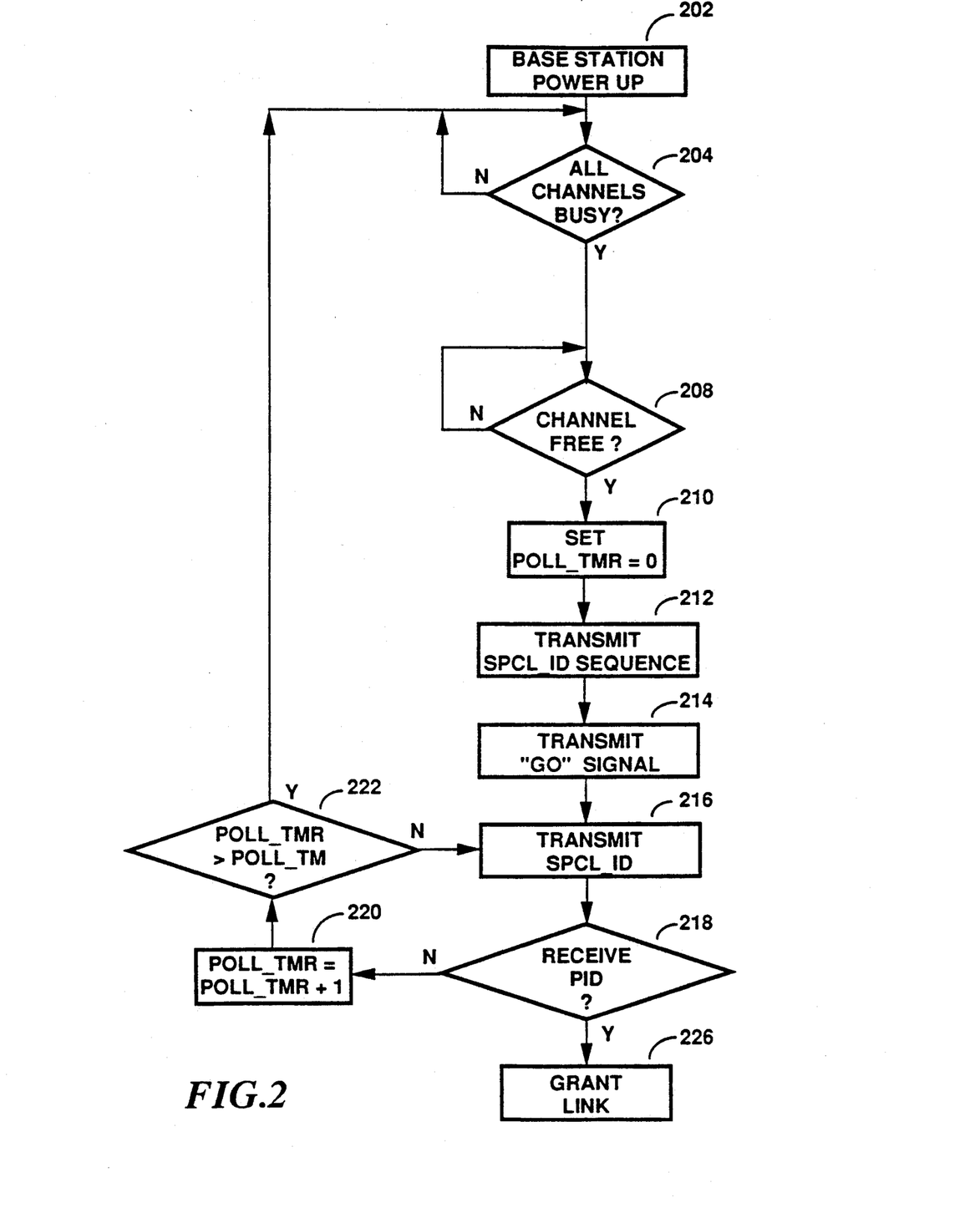
FIG. 2 is a flow chart of the telepoint base station operation in accordance with a first embodiment of the present invention.

Referring to FIG. 2 is a flow chart of the operation of a telepoint base station in accordance with the first embodiment of the present invention. When the telepoint base station, such as utilized in a second generation cordless telephone (CT2) system, is powered up at step 202, the base station controller controls the operation of the base station transceivers in a manner well known in the art. However, unlike the prior art base station controllers, the controller of the present invention also monitors the number of transceivers that are busy at any given time. As long as all transceivers are not busy, at step 204, conventional base station operation ensues. However, when the controller determines that all transceivers are busy, at step 204, the controller monitors the transceivers until a transceiver becomes available at step 208. During the time that all transceivers are busy, additional handsets may have attempted to place a call as described above. Those handsets which attempted to place a call and which were unable to do so, enter into a queue mode as will be described in detail below. When a transceiver becomes available, the base station controller sets a poll timer to zero (POLL_TMR=0), at step 210, and initiates the transmission of a special ID sequence, at step 212. The special ID sequence is transmitted for a period of time sufficient for all handsets waiting in the queue mode to receive and identify the special ID sequence, which is typically 1.4 seconds in a CT2 system. The base station controller next initiates the transmission of a "GO" signal, at step 214, followed periodically thereafter by the transmission of the special ID (SPCL_ID), at step 216. The "GO" signal can be any signal which does not require acknowledgement from the handset, such as SIG, Class O, defined in the CT2 Common Air Interface (CAI) protocol, which is normally used to stop audible signals. The "Go" signal causes only those handsets which have entered the queue mode to switch to enter a channel acquisition mode as will be described in detail below. In the channel acquisition mode, the handset having been in queue the longest is the first to reply. Following the "GO" signal, the controller begins to look for the transmission of a PID from a handset which may be in the queue mode, at step 218. When a PID is not received within a predetermined time interval at step 218, the poll timer is incremented, at step 220, followed by the controller checking to see if the poll timer exceeds a maximum poll timer time (POLL_TM). When the poll timer time is exceeded at step 222, indicating that no handset has responded to the poll signal, the controller returns the base station to normal operation at step 204.

When the controller detects the PID of a responding handset, at step 218, the base station generates a link grant at step 226, enabling the responding handset to complete connection to place a call.

In summary, whenever a base station has all channels active, there is an opportunity that additional handsets may have attempted to place a call, but were blocked due to the non-availability of a channel. Following the availability of a channel, a polling signal is transmitted which prepares all handsets which may have entered the queue mode to look for the "GO" signal. Following the "GO" signal, the handset which is in queue the longest will be the first to respond, as will be further described below.

Figure 3:
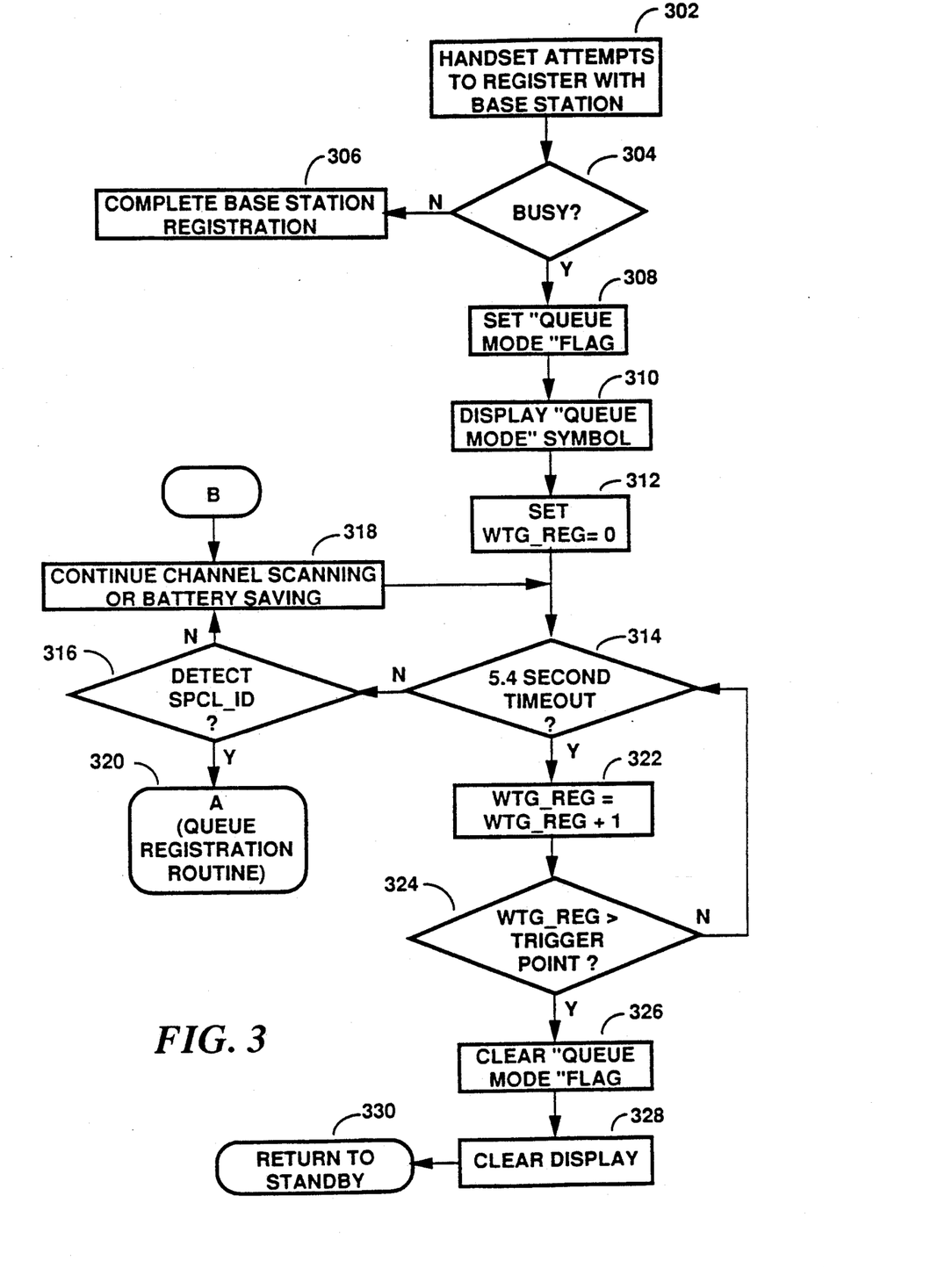
FIGS. 3-5 are flow charts depicting the operation of the portable radiotelephone handset in accordance with a first embodiment of the present invention.

FIG. 3 is a flow chart illustrating the operation of the handset in accordance with the first embodiment of the present invention. When a handset attempts to register with a base station, at step 302, and finds at least one channel open, at step 304, the handset completes registration with the base station as is well known to one of ordinary skill in the art, at step 306, enabling the handset user to place the call. When the handset finds that no channel is available, at step 304, the handset controller, which in the preferred embodiment of the present invention is a microcomputer, sets a queue mode flag at step 308 and displays a queue mode symbol on the handset display, at step 310, indicating to the handset user that no channel is immediately available. A waiting time register (WTG_REG) is reset at step 312, and an interrupt timer is started which in the preferred embodiment generates timing pulses every 5.4 seconds at step 314, although it will be appreciated that other timing intervals can be used as well. When the timing interrupt is generated at step 314, the waiting time register is incremented at step 322 and the value obtained is checked against a maximum waiting time at step 324. The maximum waiting time, or trigger point, in the preferred embodiment of the present invention is a count of 333, which with 5.4 second interrupts, results in a maximum waiting time allowable of approximately thirty minutes (5.4 sec.×333/60 sec=29.97 minutes) which is more than a sufficient queue time. In most instances, after waiting for thirty minutes, the handset user would generally have taken alternate action, such as moving to another telepoint base station site. When the trigger point is not exceeded at step 324, the operation returns to step 314 to await the next timing interrupt. During the time interval between timing interrupts, the controller is continuously monitoring the information received to determine when the special ID is received, at step 316, indicating a channel has become available. When the special ID is not detected at step 316, the receiver continues to scan other channels, or goes into a battery saving mode at step 318 to await the next timing interrupt at step 314. When the special ID is detected at step 316, the controller enters the queue registration routine at step 320 which will be described in detail below.

When the value of the waiting time register exceeds the trigger point value, at step 324, the queue mode flag is cleared, at step 326 and the queue mode symbol is cleared from the display at step 328, after which the controller returns to the standby mode, until the next time the handset user attempts to make a call.

In summary, when a handset attempts to establish communication with a base station that is busy, the handset enters a queue mode and alerts the user that the base station is busy. The controller thereafter monitors the channel looking for a special ID indicative that a channel has become available. A waiting time timer is started in the handset when the queue mode is entered, and indicates the amount of time that the handset is in the queue mode.

Figure 4:
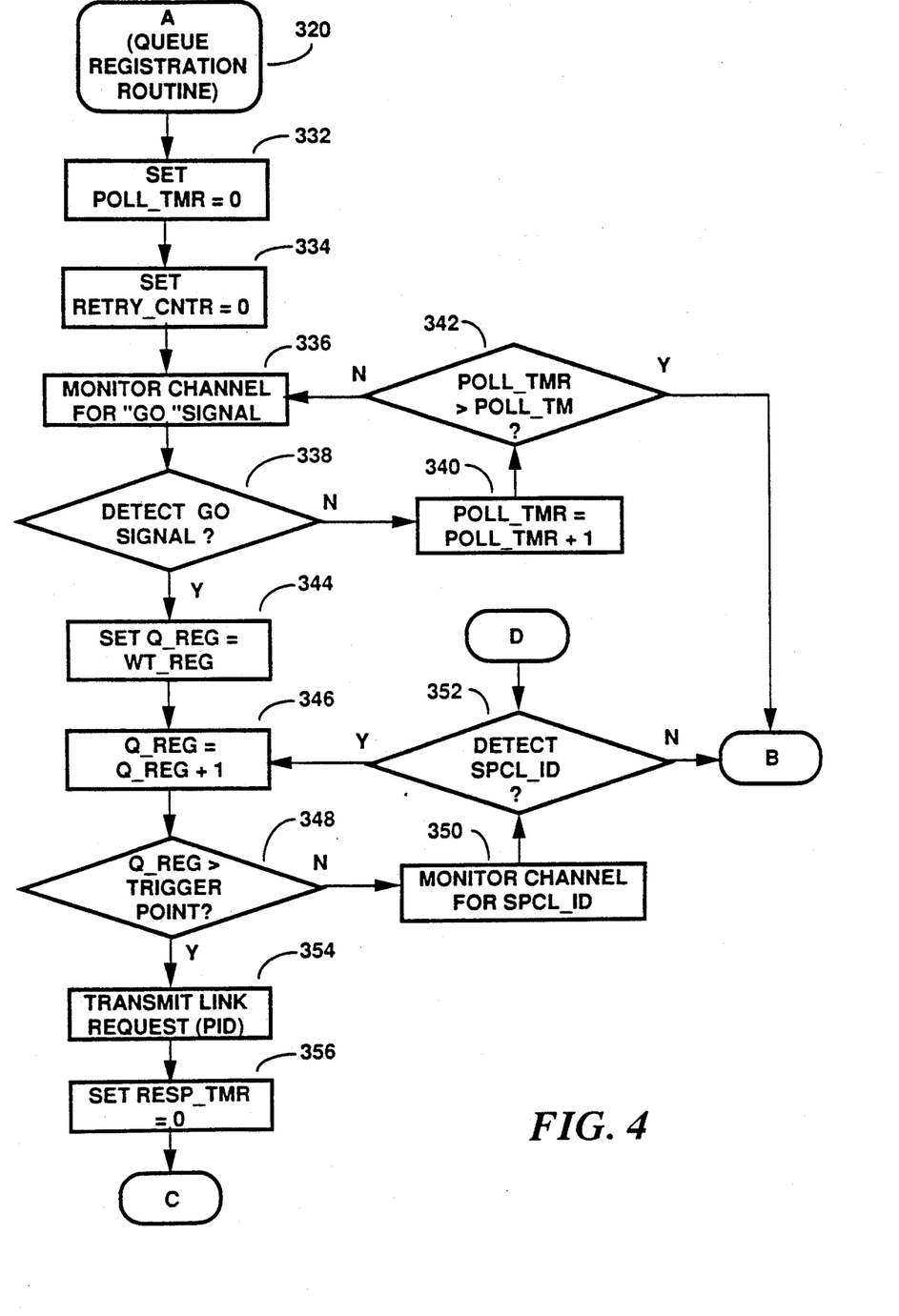

FIG. 4 is a flow chart illustrating the queue registration routine in accordance with the first embodiment of the present invention. When the queue registration routine is entered at step 320, a poll timer (POLL_TMR) is set to zero, at step 332, and a retry counter (RETRY_CNTR) is also set to zero, at step 334. The controller then monitors the channels looking for the "GO" signal, at step 336. When the "GO" signal is not detected within a predetermined time interval, at step 338, the poll timer is incremented, at step 340, and the value of the poll timer is compared to a maximum poll timer value at step 342. When the poll timer value exceeds the maximum poll timer value, at step 342, the operation returns to the scanning, or battery saving mode, at step 318 of FIG. 3.

Returning to FIG. 4, when the poll timer value is less than the maximum poll timer value, at step 342, the controller returns to monitor the channel, at step 336. When the "GO" signal is detected, at step 338, the queue register (Q_REG) is set to the value of the waiting time register, at step 344. The queue register value is then incremented at step 345 and thereafter every time the special ID is detected (every six milliseconds) and the new value compared to the trigger point value, at step 348. By incrementing the queue register at the six millisecond rate, the maximum time to reach the trigger point is approximately two seconds (0.006 seconds×333=1.998 seconds). When the new queue register value is less than the trigger point value, the controller monitors the channel during the receive interval looking for the special ID, at step 350. The special ID is periodically transmitted by the base station at six millisecond time intervals until a handset attempts to register, consequently, when the special ID is not detected at step 352, the controller knows that another handset has gained access to the base station, and the handset operation returns to the scanning or battery saving mode, at step 318 of FIG. 3.

When the special ID is detected, at step 352, the queue register value is again incremented, at step 346 and compared to the trigger point value, at step 348. When the trigger point value is exceeded, at step 348, the handset transmits a link request which includes the portable identification number (PID) in a manner well known in the art at step 354. The controller then resets a response timer to zero at step 356.

Since more than one handset can be in the queue mode, the waiting time value is also updated and maintained by all handsets in the queue mode, so that if another handset gains first access to the available channel, other handsets in queue can retain their position relative to each other.

Figure 5:
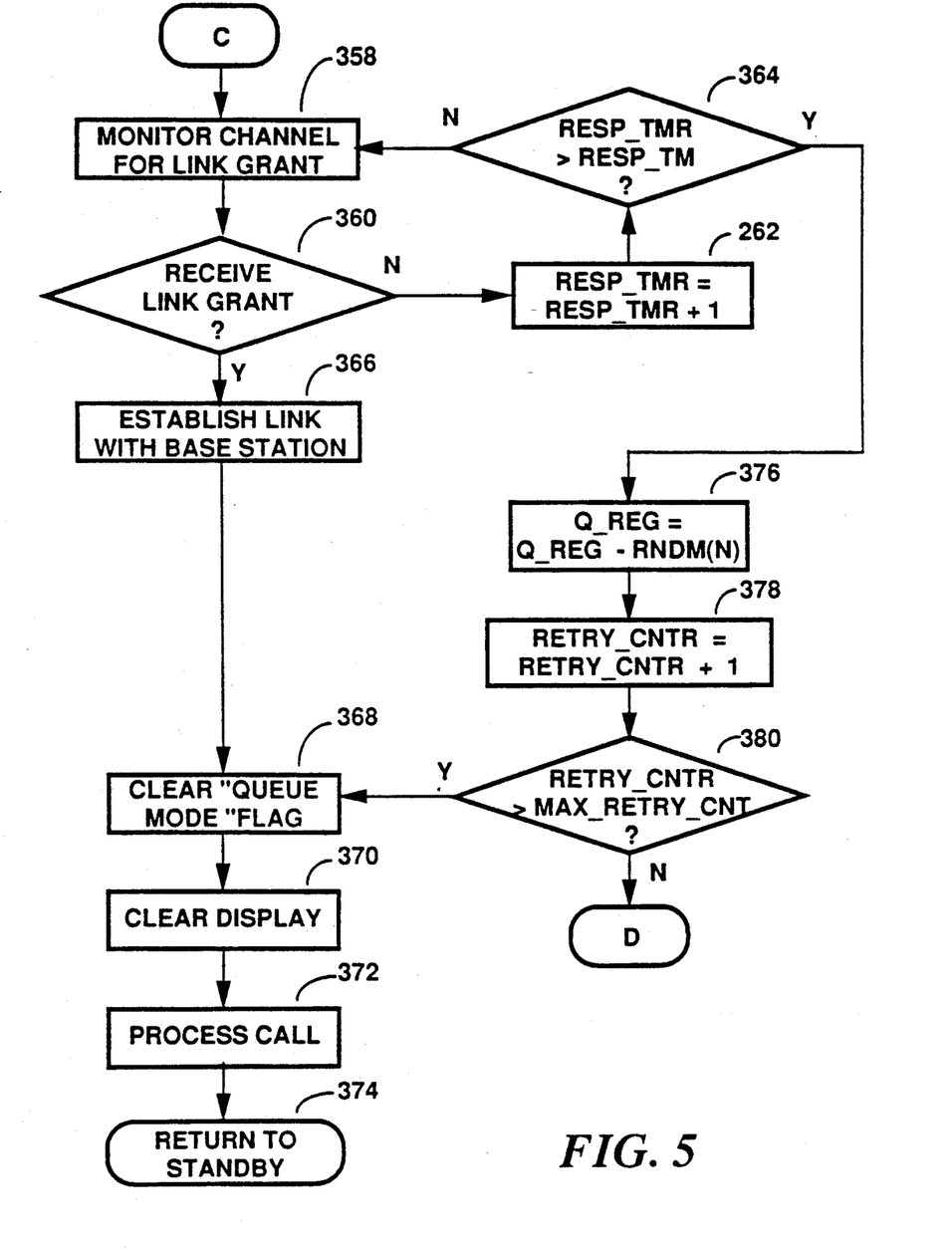

Proceeding to FIG. 5, the handset then monitors the channel for a link grant from the base station, at step 358. If the link grant is not received at step 360, the response timer is incremented, at step 362 and the present value is compared with the maximum response timer value, at step 364. When the maximum response timer value is not exceeded, at step 364, the handset returns to monitor the channel for a link grant, at step 358, as described above.

When the response timer value exceeds the maximum response time value, at step 364, indicating a possible collision may have occurred with two handsets substantially simultaneously transmitting a link request, at step 354 of FIG. 4, the queue register value is reset to a new value by subtracting a random value from the present contents of the queue register, at step 376. In the preferred embodiment of the present invention, the random value ranges from 0-10, although it will be appreciated that other values can be utilized as well. For a random value of 10, the waiting time is then moved 54 seconds (10×5.4 seconds). The retry register is also incremented, at step 378 and the present value is then compared to the maximum retry count value, at step 380. When the retry count value does not exceed the maximum retry count value, at step 380, the process flow returns to step 352 of FIG. 4 wherein the handset again looks for the detection of the special ID which is continuing to be generated because the base station was unable to complete the registration with one of the two handsets which attempted a substantially simultaneous registration, at step 354.

Returning to FIG. 5, when the link grant is received, at step 360, indicating that only one handset attempted to register with the base station, the link with the base station is established, at step 366. Following the establishment of the link with the base station, at step 366, or when the retry counter value exceeds the maximum retry count value, at step 380, the queue mode flag is cleared, at step 368, the queue mode icon is cleared on the display, at step 372, and the call is processed, at step 370. Following the completion of the call, at step 372, the handset returns to the standby mode, at step 374.

Figure 6:
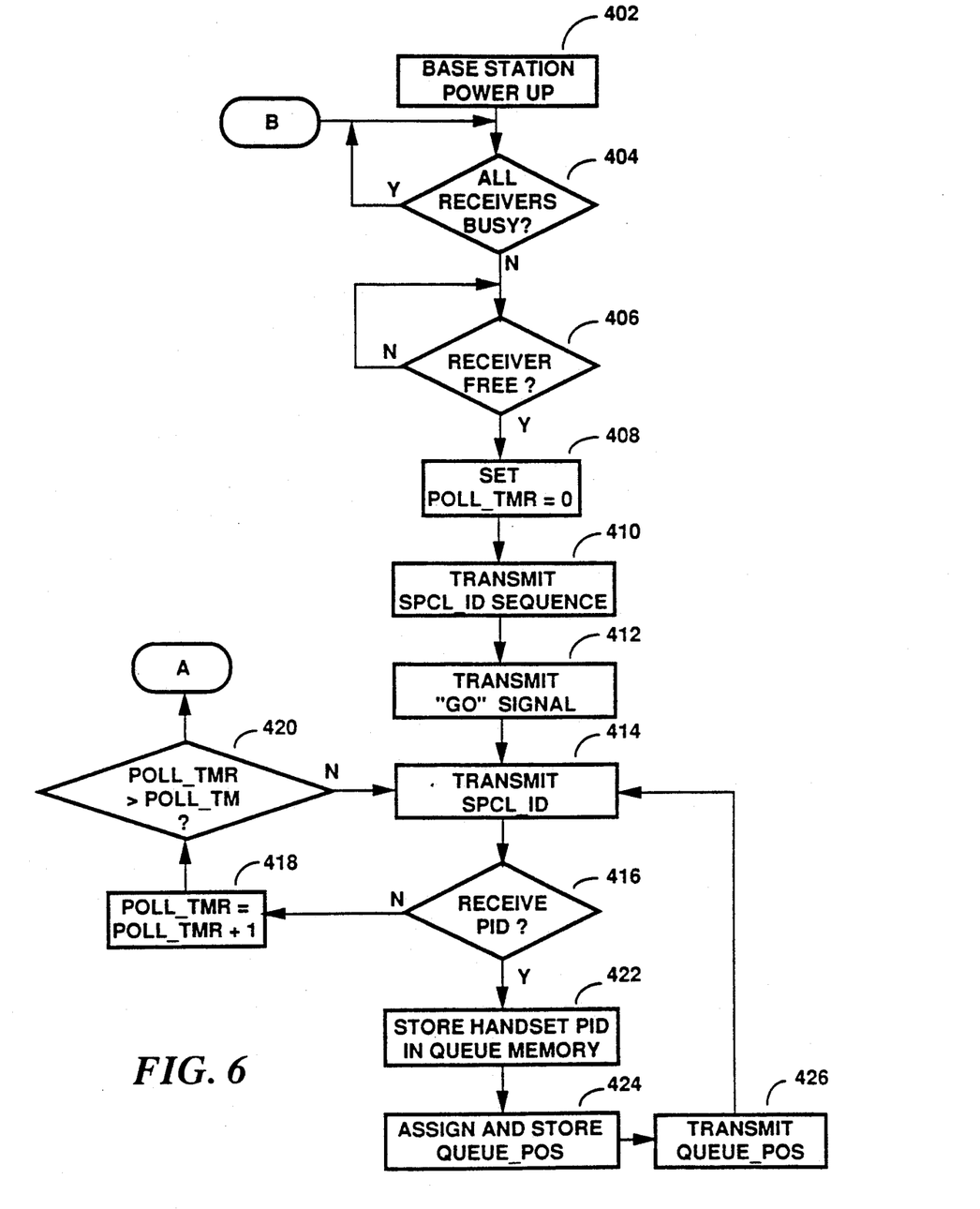
FIGS. 6 and 7 are flow charts of the telepoint base station operation in accordance with a second embodiment of the present invention.
Figure 7:
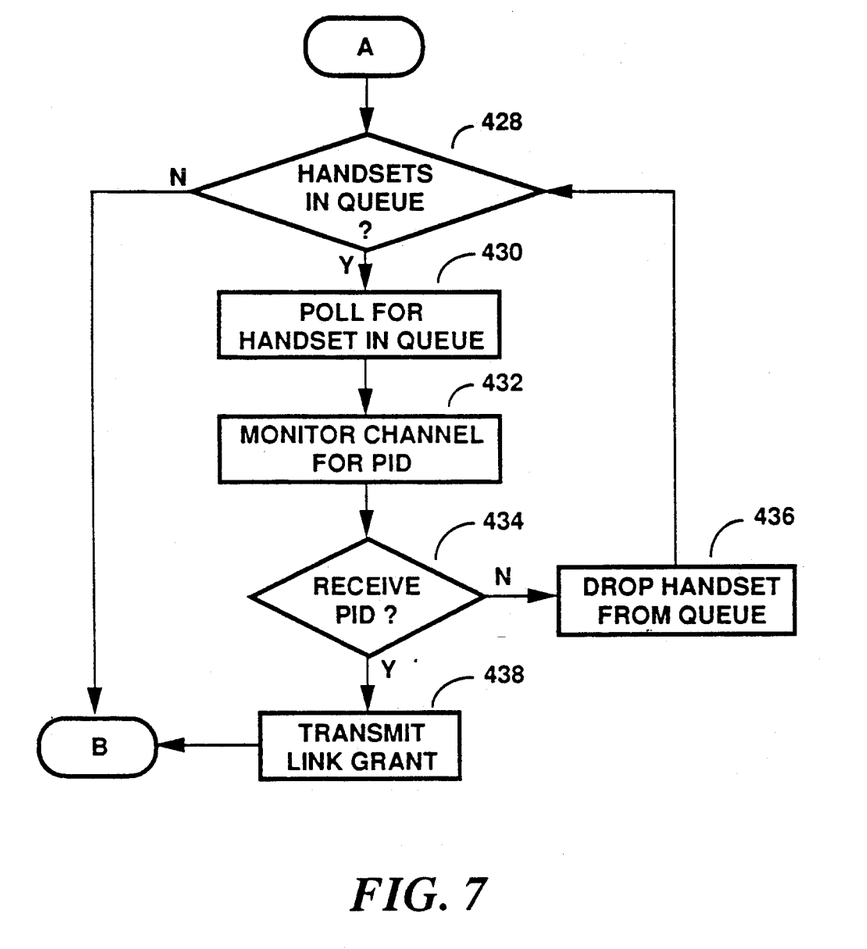

FIGS. 6 and 7 are flow charts of the telepoint base station operation in accordance with a second embodiment of the present invention. Referring specifically to FIG. 6, when a telepoint base station, such as utilized in a second generation cordless telephone (CT2) system, is powered up at step 402, the base station controller controls the operation of the base station transceivers in a manner well known in the art. However, unlike the prior art base station controllers, the controller of the present invention also monitors the number of transceivers that are busy at any given time. As long as all transceivers are not busy, at step 404, conventional base station operation ensues. However, when the controller determines that all transceivers are busy, at step 404, the controller monitors the active transceivers until a transceiver becomes available at step 406. During the time that all transceivers are busy, additional handsets may have attempted to place a call as described above. Those handsets which attempted to place a call and which were unable to do so, enter into the queue mode as described above. When a transceiver becomes available, the base station controller sets a poll timer to zero (POLL_TMR), at step 408, and initiates the transmission of a special ID sequence, at step 410. The special ID sequence is transmitted for a period of time sufficient for all handsets waiting in the queue mode to receive and identify the special ID sequence, which as described above is typically 1.4 seconds in a CT2 system. The base station controller next initiates the transmission of a "GO" signal, at step 412, followed periodically thereafter by the transmission of the special ID (SPCL_ID), at step 414. The "Go" signal causes only those handsets which have entered the queue mode to switch to a channel acquisition mode. In the channel acquisition mode, the handset having been in queue the longest is the first to reply as described above. Following the "GO" signal transmission, the controller begins to monitor for the transmission of a PID from a handset which is in the queue mode, at step 416. When a PID is not received within a predetermined time interval at step 416, the poll timer value is incremented, at step 418, followed by the controller checking to see if the poll timer value exceeds a maximum poll timer value (POLL_TM), at step 420. When the poll timer value is exceeded at step 420, indicating that the polling time interval has been exceeded, the controller proceeds to contact the handset which is first in queue, at step 428 of FIG. 7, to be described below.

Returning to FIG. 6, when the controller detects the PID of a responding handset, at step 416, the base station stores the PID of the responding handset in a queue memory, at step 422, and assigns and stores a queue position for the responding handset, at step 424. The controller then enables the transmission of the queue position to the responding handset, at step 426.

In summary, whenever a base station has all channels active, there is an opportunity that additional calls may have been attempted to be placed, but were blocked due to the non-availability of a channel. Following the availability of a channel, a polling signal is transmitted which prepares all handsets which may have entered the queue mode to look for the "GO" signal. Following the "GO" signal, the handsets which are in the queue mode reply to the base station and are assigned a queue position which corresponds to the order in which the handsets replied to the base station.

When the poll timer times out, at step 420 of FIG. 6, the controller determines whether there were any handsets in queue, at step 428 of FIG. 7. When no handsets responded to the first polling sequence, at step 428, the controller returns the operation of the base station to conventional operation, at step 404 of FIG. 6. Returning to FIG. 7, when one or more handsets are in queue, at step 428, the controller enables the base station to poll for the first handset in queue, at step 430, monitoring the channel for the PID, at step 434, of the first handset expected to respond. When the first handset fails to respond, at step 434, due to such circumstances as the user moved out of range of the base station, the handset is dropped from queue, at step 436. The controller then determines if any additional handsets are in queue, at step 428, whereupon the controller enables the base station to poll for the next handset in queue, at step 430, monitoring the channel, at step 432, as described above. When the PID is received, at step 434 from the responding handset, the base station transmits a link grant, at step 438, enabling the completion of the call with the handset.

In summary, after all handsets which may be in the queue mode are determined during the polling cycle, the base station can sequentially poll each handset in the order of their response, thereby queueing the calls under the control of the base station for handsets which were unable to complete call attempts due to the non-availability of channels at any particular period of time.

The basic operation of the handsets in the second embodiment of the present invention is identical to that described in FIGS. 3 and 4 for the first embodiment of the present invention, and consequently will only be summarized here for clarity. When a handset determines that no channels are currently available, the handset enters a queue mode, starting a waiting time timer, and monitoring the channels for a poll from the base station. When the "GO" signal has been received, and the polling signals are detected, the information in the waiting time register is transferred to a queue register to enable any handsets which are in queue the opportunity to respond in an order dependent upon the length of time each handset was in the queue mode, as described above. Having responded, the handset operation continues as shown in FIG. 8.

Figure 8:
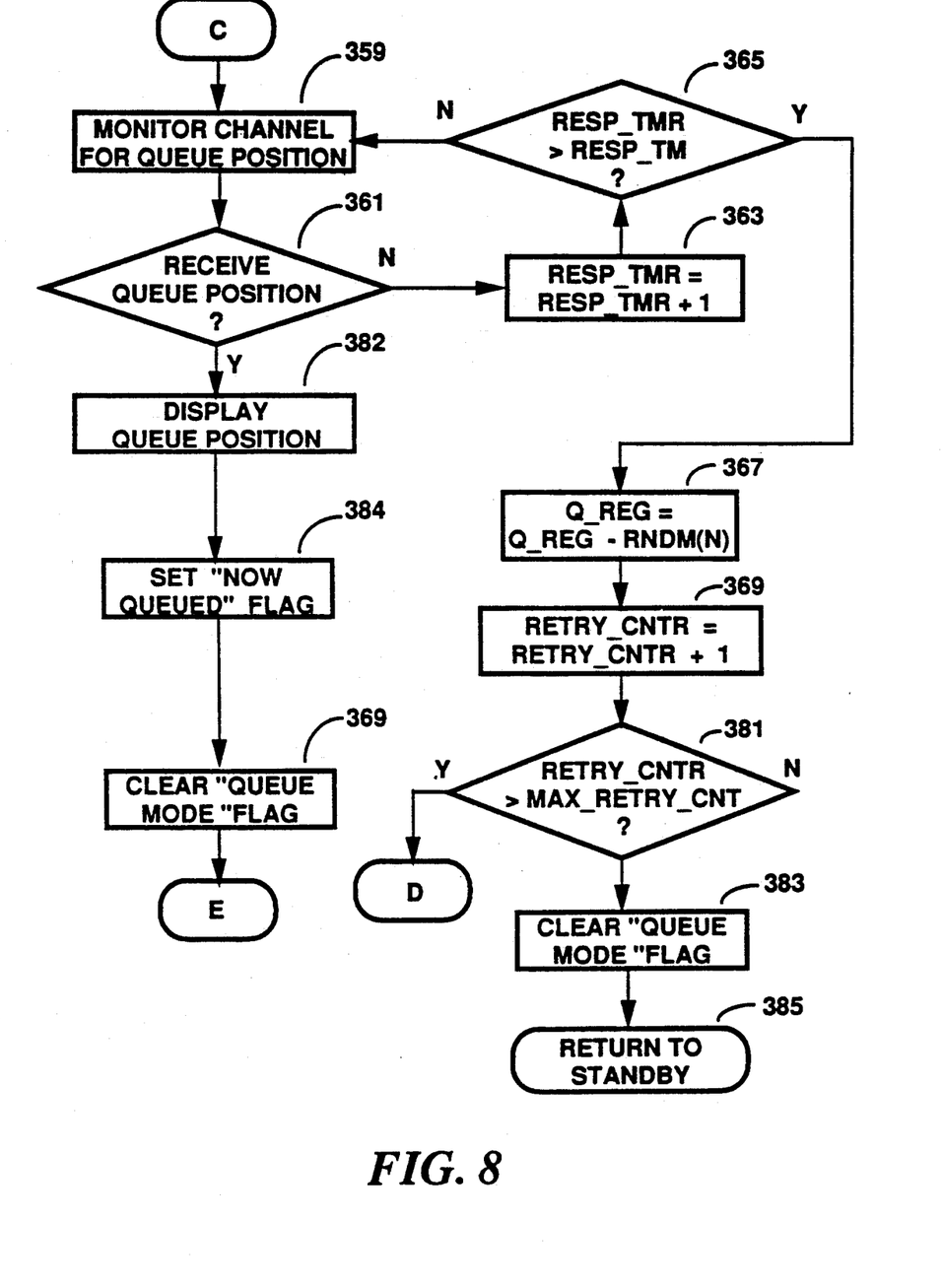
FIGS. 8 and 9 are flow charts of the portable radiotelephone handset operation in accordance with a second embodiment of the present invention.

Proceeding to FIG. 8, the handset then monitors the channel for a transmission from the base station, at step 359, which will provide the queue position determined by the base station. If the queue position is not received at step 361, the response timer value is incremented, at step 363, and the present value is compared with the maximum response timer value, at step 365. When the maximum response timer value is not exceeded, at step 364, the handset returns to monitor the channel for the queue position, at step 359, as described above.

When the response timer value exceeds the maximum response time value, at step 365, indicating a possible collision may have occurred with two handsets substantially simultaneously transmitting a link request, at step 354 of FIG. 4, the queue register value is reset to a new value by subtracting a random value from the present value of the queue register, at step 377, as described above. The retry counter is also incremented, at step 379, and the present value is then compared to the maximum retry counter value, at step 381. When the retry counter value does not exceed the maximum retry counter value, at step 381, the process flow returns to step 352 of FIG. 4 wherein the handset again looks for the detection of the special ID which is continuing to be generated because the base station was unable to complete the registration with one of the two handsets which attempted a substantially simultaneous registration, at step 354. If the retry counter value exceeds the maximum retry counter value at step 381, the queue mode flag is cleared at step 383 and the handset returns to standby mode at step 385.

Returning to FIG. 8, when the queue position is received, at step 361, the queue position is displayed on the handset display, at step 382, a "now queued" flag is set at step 384, and the queue mode flag is then cleared at step 369.

Figure 9:
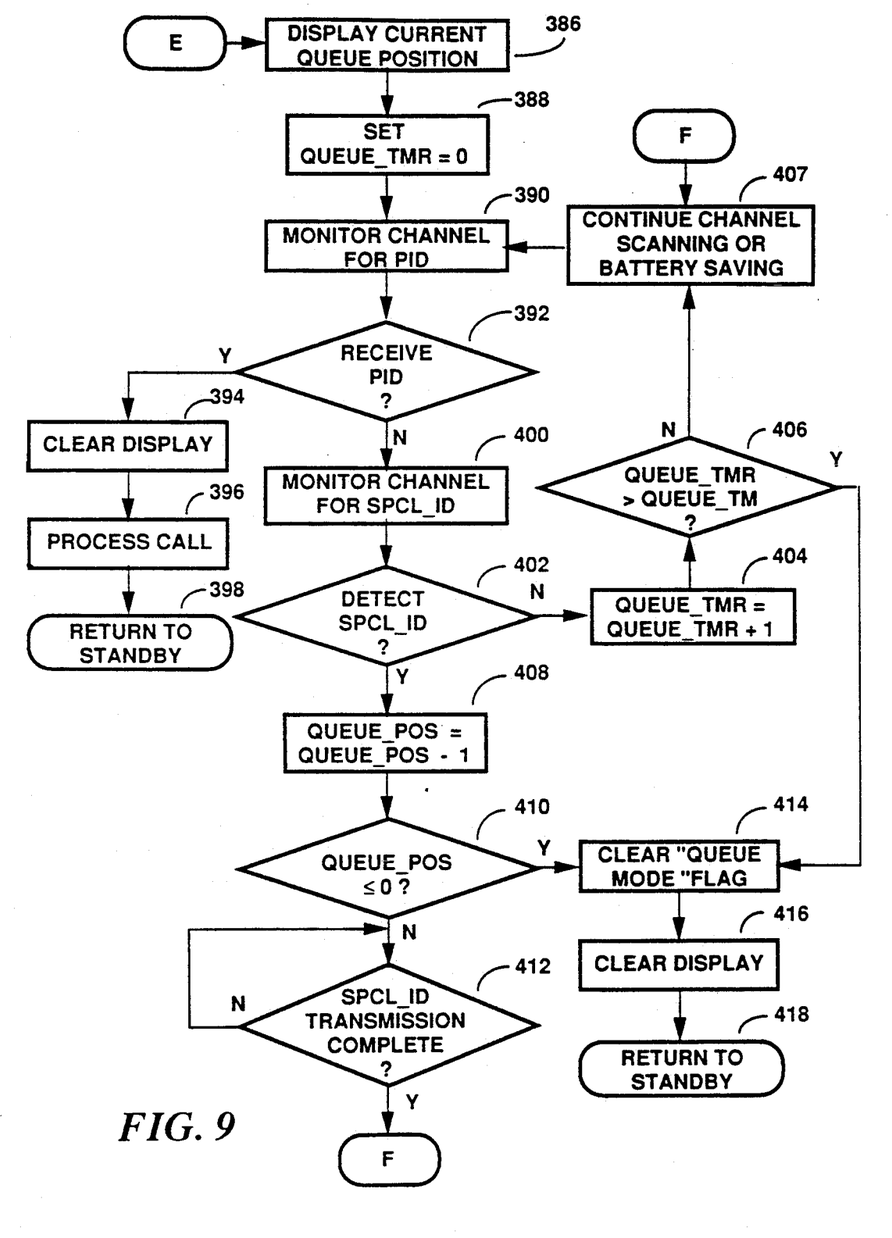

The handset operation then continues as shown in FIG. 9, wherein the current queue position is displayed, at step 386. By displaying the current queue position, the handset user is roughly informed as to how long it can be before the call can be completed. A handset which is in the first queue position can expect a fairly short period of time after which the call can be completed, wherein a handset which in the second or higher queue position can expect a longer wait.

The controller next sets the queue timer to zero, at step 388, and monitors the channel for the transmission of its PID from the base station, at step 390. When a PID is received, and the PID received belongs to the handset, at step 392, the display is cleared, at step 394, and the call is processed in the regular manner, at step 396, after which the handset controller returns to the standby mode, at step 398, when the call is completed.

When the PID received belongs to another handset, at step 392, the handset controller returns to monitor the channel for continuing transmissions of the special ID, at step 400. When the special ID is not detected within a predetermined time interval, at step 402, the queue timer value is incremented, at step 404, and the present queue timer value is then compared to the maximum queue time value at step 406. When the present queue timer value does not exceed the maximum queue timer value, at step 406, the handset continues channel scanning or battery saving, at step 407, while monitoring the channel for the next PID transmission, as described above. When the queue timer value exceeds the maximum queue timer value, at step 406, the queue mode flag is cleared, at step 414, the queue mode icon is cleared from the display, at step 416, and the handset returns to the standby mode, at step 418.

When the special ID is detected, at step 402, after an incorrect PID was received, at step 392, the queue position register storing the current queue position of the handset is decremented, at step 408, thereby updating the current queue position of the particular handset. The queue position value is then checked, at step 410, and when the value is less than or equal to zero, indicating the handset missed the PID transmission directed to it, the queue mode flag is cleared, at step 414, the queue mode icon is cleared from the display, at step 416, and the handset returns to the standby mode, at step 418.

When the queue position value is greater than zero, at step 410, the controller checks to see that the current special ID transmission time interval is complete, at step 412, after which the flow continues to step 407 and the operation continues from there as described above.

In summary, once the handset has responded to a poll from the base station and has been assigned a queue position, the handset monitors the channel for its PID in order that the handset can complete the call. Each time a PID is received which belongs to a different handset, the current queue position is updated, thereby indicating to the handset user how soon the call may be completed.

Figure 10:
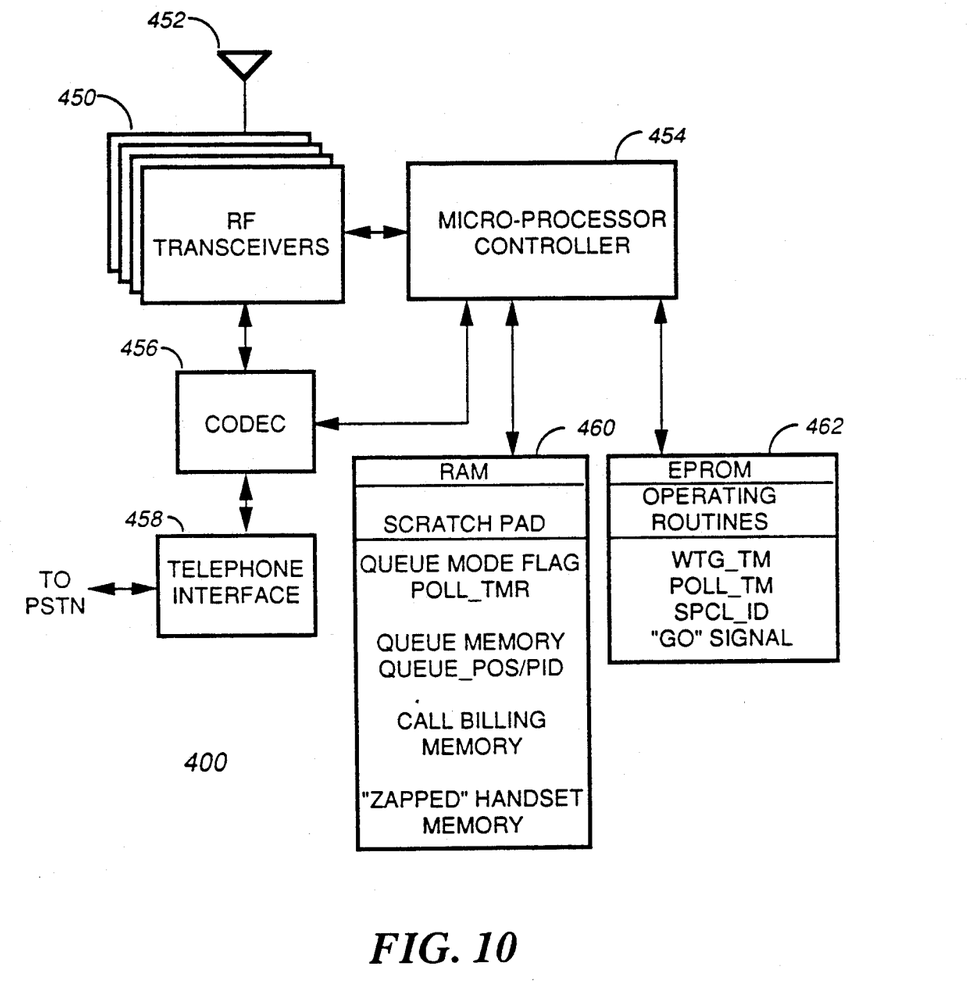
FIG. 10 is an electrical block diagram of the telepoint base station in accordance with the first or second embodiments of the present invention.

FIG. 10 is an electrical block diagram of the telepoint base station in accordance with the first or second embodiments of the present invention. The base station includes one or more transceivers 450 which are coupled to an antenna 452. The number of receivers provided at any given base station determines the call handling capability of the base station. A controller 454, preferably microprocessor or microcomputer based, controls the operation of the transceivers, and also enables monitoring the number of transceivers which are in use, and when there is a potential that a call may have been missed, operates as described above. The output of the transmitter portion of the transceiver and the receiver portion of the transceiver are coupled to a codec 456 to enable processing of the voice information, in a manner well known in the art. A telephone interface 458 is provided to enable coupling of the base station to the public switched telephone network, thereby enabling calls originated from portable radiotelephone handsets to be directed to the called party.

Coupled to the microprocessor based controller 454 is a read only memory 462, which is preferably an electrically erasable programmable read only memory (EEPROM), although it will be appreciated that other types of read only memories can be utilized as well. The read only memory 462 includes routines necessary to control the operation of the base station, and additional memory positions which store the maximum waiting time (WTG_TM), the maximum poll time (POLL_TM), the special ID (SPCL_ID) used to poll handsets which are in the queue mode, and the "GO" signal codeword which is used to initiate handset responses during the polling cycle, as described above.

Also coupled to the microprocessor controller is a random access memory (RAM) 460 which provides scratch pad memory location for processing of the operating routines stored in the read only memory 462, memory locations for the queue mode flag, poll timer, and queue position and corresponding handset PID when the base station is used in the second embodiment of the present invention. The random access memory 460 also stores call billing information and "zapped" handset information as is well known in the art.

Figure 11:
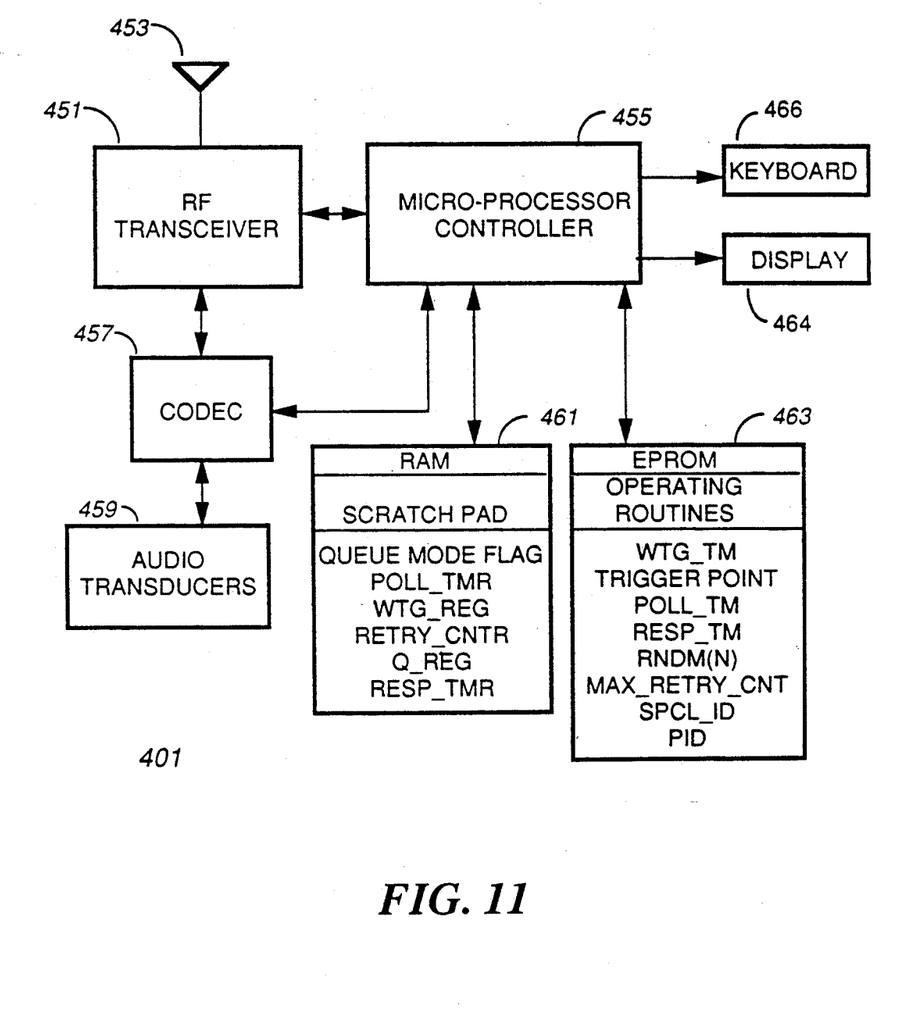
FIG. 11 is an electrical block diagram of the portable radiotelephone handset in accordance with the first or second embodiments of the present invention.

FIG. 11 is an electrical block diagram of the portable radiotelephone handset in accordance with the first or second embodiments of the present invention. The portable radiotelephone handset includes a synthesized RF transceiver 451 which is coupled to an antenna 453. A controller 455, preferably microprocessor or microcomputer based, controls the channel scanning and other operation of the transceiver, and controls the selection of the queue mode when it is determined there are no immediately available channels at a telepoint base station location, as described above. The output of the transmitter portion of the transceiver and the receiver portion of the transceiver are coupled to a codec 457 to enable processing of the voice information, in a manner well known in the art. A numeric display 464 is provided which includes icons identifying operational characteristics of the handset, including an icon for the queue mode, and as in the second embodiment of the present invention, the queue position. A numeric function keyboard 466 allows the handset user to enter phone numbers when placing a call.

Coupled to the microprocessor based controller 455 is a read only memory 463, which is preferably an electrically erasable programmable read only memory (EE-PROM), although other read only memory types can be utilized as well. The read only memory 463 includes the routines necessary to control the operation of the handset, as well as memory positions which store the maximum waiting time (WTG_TM), the trigger point, the maximum poll time (POLL_TM), the maximum response time (RESP_TM), the random number (RNDM(N)) used to resolve collisions, the maximum retry count (MAX_RETRY_CNT, the special ID (SPCL_ID) used to poll handsets which are in the queue mode, and the portable unit ID (PID), as described above.

Also coupled to the microprocessor controller is a random access memory (RAM) 461 which provides a scratch pad memory location for processing of the operating routines stored in the read only memory 463, memory locations for the queue mode flag, waiting time register (WTG_REG), poll timer (POLL_TMR), retry counter (RETRY_CNTR) and queue position (Q_REG) and response timer (RESP_TMR).

We claim:

1. A method for queueing calls being placed from portable radiotelephone handsets to a base station which provides operation on at least one channel operable on at least one frequency, the handsets being capable of operating on a plurality of frequencies, including the at least one frequency, the method comprising the steps of:

at the base station,
  determining when the at least one channel is busy; and
  transmitting a first predetermined code when the at least one channel becomes subsequently available; at a handset attempting to establish communication with the base station,
  detecting when the at least one channel is busy while attempting to place a call;
  detecting the transmission of the first predetermined code;
  generating a first count representative of the elapsed time between detecting when the channel is busy and when the first predetermined code is detected;
  generating a second count starting at the first count when the first predetermined code is detected;
  comparing the second count generated with a predetermined count; and
  attempting to establish communication between the handset and the base station when the second count matches the predetermined count.

2. The method for queueing calls being placed from portable radiotelephone handsets according to claim 1, further comprises the steps of:
  transmitting, from the base station, a second predetermined code; and
  detecting, at the handset, the second predetermined code,
  wherein said step of generating the second count, generates the second count in response to the second predetermined code being detected.

3. The method for queueing calls being placed from portable radiotelephone handsets according to claim 2, further comprises the steps of:
  at the base station,
  transmitting for a predetermined time interval the first predetermined code periodically following the transmission of the second predetermined code; and
  suspending the transmission of the first predetermined code during the predetermined time interval when communication is established with one of the handsets attempting to establish communication therewith.

4. The method for queueing calls being placed from portable radiotelephone handsets according to claim 3, further comprising the steps of:
  at the handset,
  continuing to generate the first count during the predetermined time interval;
  detecting during the predetermined time interval, the absence of transmission of the first predetermined code; and
  generating a further first count representative of the elapsed time interval between detecting when the at least one channel is initially busy and when a transmitted first predetermined code is again detected.

5. The method for queueing calls being placed from portable radiotelephone handsets according to claim 1 wherein communication between the portable radio telephone handset and the base station was not established during said attempting to establish step, and said method for queueing further comprises the steps of:
  at the handset, detecting when communication is not established with the base station in response to attempting to establish the same;

incrementing the first count by a randomly generated number to generate a modified first count;

generating a second count starting at the modified first count;

comparing the second count generated with the predetermined count; and attempting to establish communication between the handset and the base station when the second count matches the predetermined count.

6. The method for queueing calls being placed from portable radiotelephone handsets according to claim 1, further comprising the steps of:

at the handset, transmitting a handset identification to the base station when the second count matches the predetermined count;

at the base station, receiving, during a predetermined time interval, the handset identification transmitted from one or more handsets, and in response thereto assigning queue numbers;

transmitting the queue numbers to the handset responding after the predetermined time interval; and at the handset receiving the assigned queue number;

monitoring the channel to determine channel activity; and establishing communication between the handset and the base station in accordance with the queue number assigned.

7. A communication system providing call queueing, said communication system comprising:

a base station, comprising base station transceiver means having at least one communication channel operable on at least one frequency, for establishing communication with a plurality of portable communication handsets, means, coupled to said base station transceiver means, for determining when the at least one channel is busy, and base station controller means coupled to said base station transceiver means for controlling the transmission of a first predetermined code when the at least one channel becomes subsequently available; and said plurality of portable communication handsets, comprising handset transceiver means for establishing communication with said base station on the at least one frequency, first detecting means, coupled to said handset transceiver means, for detecting when the at least one channel is busy while attempting to place a call;

second detecting means, coupled to said handset transceiver means, for detecting the transmission of the first predetermined code;

count generating means, responsive to said first and second detecting means, for generating a first count representative of the elapsed time between detecting the at least one channel is busy, and when the first predetermined code is detected;

means for generating a second count starting with the first count, and handset controller means coupled to handset transceiver means for controlling an attempt to establish communication with said base station when the second count matches a predetermined count.

8. The communication system according to claim 7, wherein said base station further comprises means for transmitting a second predetermined code, and said portable communication handset further comprises means for detecting the second predetermined code, wherein said means for generating the second count is responsive to the second predetermined code being detected for enabling the second count to be started.

9. The communication system according to claim 8, wherein said base station further comprises:

timing means, responsive to the second predetermined code being detected, for generating periodic timing signals for a predetermined time interval, wherein said base station controller means being responsive to said timing means for periodically transmitting the first predetermined code during the predetermined time interval, and further wherein said base station controller means being further responsive to said handset attempting to establish communication with said base station for suspending the transmission of the first predetermined code prior to concluding the predetermined time interval.

10. The communication system according to claim 9, wherein said count generating means continues to generate the first count during the predetermined time interval, and wherein said handset further comprises:

means for detecting, during the predetermined time interval, the absence of transmission of the first predetermined code, and wherein said count generating means continues to generate the first count until the transmitted first predetermined code is again detected, the first count being representative of the elapsed time interval between detecting when the at least one channel is initially busy and when a transmitted first predetermined code is subsequently detected.

11. The communication system according to claim 7 wherein said handset further comprises:

means for detecting when communication is not established with the base station in response to attempting to establish the same;

means for incrementing the first count by a randomly generated number to generate a modified first count;

said means for generating the second count, generating a second count starting at the modified first count;

said comparing means further comparing the second count generated with the predetermined count; and said handset controller means further attempting to establish communication between the handset and the base station when the second count matches the predetermined count.

12. A portable communication transceiver having call queueing capability, and including a means for placing a call to a base station having at least one channel, the portable communication device comprising:

first means for detecting when the channel is busy while attempting to place a call, and for generating in response thereto a queue mode signal;

second means for detecting the transmission of a first predetermined code, and for generating in response thereto a counter inhibit signal;

count generating means, responsive to queue mode signal and the counter inhibit signal, for generating a first count representative of the elapsed time between when the channel is detected as being busy, and when the first predetermined code is detected;

means for generating a second count starting with the first count; and means for attempting to complete the call on the available channel when the second count matches a predetermined count.

13. The portable communication transceiver according to claim 12, wherein said base station periodically transmits the first predetermined code for a predetermined time interval, said count generating means continues to generate the first count during the predetermined time interval, and wherein the portable communication transceiver further comprises:

means for detecting when the channel is busy during the predetermined time interval; and said count generating means continues to generate the first count until the transmitted first predetermined code is again detected, the first count being representative of the elapsed time interval between detecting when the at least one channel is initially busy and when a transmitted first predetermined code is subsequently detected.

14. The portable communication transceiver according to claim 13, wherein said transceiver further comprises:

means for detecting when communication is not established with the base station in response to attempting to establish the same;

means for incrementing the first count by a randomly generated number to generate a modified first count;

said means for generating the second count, generating a second count starting at the modified first count; and said means for attempting to complete the call further attempting to establish communication between the handset and the base station when the second count matches the predetermined count.

15. The portable communication transceiver according to claim 12, wherein said transceiver transmits a handset identification to the base station when the second count matches the predetermined count, and said base station receives, during a predetermined time interval, the handset identification transmitted from one or more handsets, and in response thereto assigning queue numbers and transmits the same to the handsets responding after the predetermined time interval; and wherein said handset further comprises:

means for receiving the assigned queue number;

means for monitoring the channel to determine channel activity; and means establishing communication between the handset and the base station in accordance with the queue number assigned.

16. The portable communication transceiver according to claim 12, wherein the first count is generated at a first timing rate.

17. The portable communication transceiver according to claim 13, wherein the second count is generated at a second timing rate.

18. The portable communication transceiver according to claim 17, wherein the second timing rate is greater than the first timing rate.

* * * * *